Patented Sept. 4, 1934

1,972,142

UNITED STATES PATENT OFFICE 1,972,142

PROCESS FOR THE PRODUCTION OF CARBOXYLIC ACID AMIDES

Richard Frank Goldstein, Blackley, Manchester, England, assignor to Imperial Chemical Industries Limited, a corporation of Great Britain No Drawing. Application April 5, 1932, Serial No. 603,453. In Great Britain April 7, 1931

13 Claims. (Cl. 260—124)

This invention relates to amides of carboxylic acids, more particularly arylamides of aryl carboxylic acids, and a process for the manufacture thereof.

It is known that amides of carboxylic acids, for instance 2:3-hydroxynaphthoic acid, may be obtained by heating together a carboxylic acid and an amine with a dehydrating agent such as, for example, phosphorous oxychloride or thionyl chloride. The interaction may be carried out in an indifferent suspending medium or solvent, for example, toluene. According to prior processes of this character, however, certain of the carboxylic acid amides have been difficult to produce, particularly some of the arylamides of aryl carboxylic acids.

The present invention has for an object the production of amides of carboxylic acids by a new process which is an improvement over known methods for producing amides of carboxylic acids and is particularly advantageous for producing amides difficult to obtain by other methods. A more specific object is the production of arylamides of aryl carboxylic acids. Other objects will appear hereinafter.

These objects are accomplished according to the invention whereby amides are produced by heating together a carboxylic acid, a primary or secondary amine, and a dehydrating agent in the presence of aluminium chloride. The amount of aluminium chloride may be relatively small and the condensation may be carried out in an indifferent solvent or suspension medium.

The invention will be further illustrated, but is not limited, by the following examples in which the parts are by weight.

Example I

Two hundred fifty-two parts of anthraquinone-β-carboxylic acid, 93 parts of aniline, 5 parts of aluminium chloride and 60 parts of phosphorous trichloride are added in that order to 1300 parts of toluene and the mixture is boiled in a reflux apparatus for 20 hours. To the cooled mixture 500 parts of aqueous sodium carbonate (10% Na₂CO₃) is added, and the toluene is removed by steam distillation. The suspension remaining in the still is filtered. Substantially pure anilide of anthraquinone-β-carboxylic acid remains on the filter. The yield is about 275 parts.

Example II

Thirty-five parts of salicylic acid, 23 parts of aniline, one part of aluminium chloride and 15 parts of phosphorous trichloride are added in that order to 280 parts of chlorobenzene. The mixture is raised to reflux in one hour and refluxed for 45 minutes. To the cooled mixture aqueous sodium carbonate solution is added until on shaking a red coloration on brilliant yellow paper persists. The chlorobenzene is removed by steam distillation and the residue in the flask is cooled to 20° C. and neutralized to litmus with hydrochloric acid. The salicylanilide is filtered off, well washed with cold water and dried at 60° C. The yield is about 46 parts. The yield obtained when the condensation is effected in the absence of aluminium chloride is about 10%, or more, less than that given.

While the invention is applicable to the condensation of carboxylic acids and primary and secondary amines in general, it is particularly advantageous in the production of arylamides of aryl carboxylic acids (aroylarylamines). Generally speaking, in carrying out the condensation it is preferable to employ the carboxylic acids of the benzene, naphthalene, and anthraquinone series and the primary and secondary amines of the benzene series. The process is especially desirable for the treatment of carboxylic acids of the anthraquinone series. Thus, the amide of the carboxylic acid described in Example I is difficult to obtain by other methods. The condensations involving the following carboxylic acids and any of the primary or secondary amines listed thereafter merit special mention: carboxylic acids—2-hydroxy-3-naphthoic acid, para-chlor-benzoic acid, anisic acid, beta-naphthoic acid, para-methyl-benzoic acid, 5-brom-1-naphthoic acid, carbazole-3-carboxylic acid, nicotinic acid, anthraquinone-alpha-carboxylic acid, acetic acid, propionic acid, and 6-chlor-anthraquinone-1-carboxylic acid; amines—methyl amine, dimethyl amine, ethyl amine, dibutylamine, cyclo-hexylamine, piperidine, aniline, ethylaniline, ortho-toluidine, meta-toluidine, para-toluidine, the xylidines, ortho-cresidine, meta-cresidine, para-cresidine, the chloranilines, the nitranilines, pyrrolidine and cyclopentylamine.

The kind of dehydrating agent employed in effecting the condensation is subject to considerable variation but, in general, very satisfactory results are obtained with phosphorous halides, such as, for example, phosphorus trichloride or thionyl chloride.

The solvent or suspension medium may be any liquid which is inert to reactants or does not affect the reaction unfavorably. It is preferable to employ organic liquids such as, for example, a petroleum fraction (kerosene and the like), or an aromatic hydrocarbon or liquid derivative, e. g., toluene or nitrobenzene, since even here it is found that, contrary to expectation, the aromatic compounds so employed are not attacked by the aluminium chloride.

The temperature of the condensation may vary within relatively wide limits depending largely upon the nature of the carboxylic acid and amine employed, but should preferably be below the temperature giving rise to decomposition of the materials involved in the reaction. In general, the temperature should be so regulated as to allow the reaction to proceed smoothly, yet quickly, and with avoidance of side reactions.

The process of the invention is of value for the large scale production of carboxylic amides. Moreover, as previously indicated, it is particularly valuable for the production of carboxylic amides otherwise obtainable only with difficulty and, in many instances, its use results in increased yields over those obtainable by previous processes. The products are useful for various purposes in the chemical industry, especially as dyes and dye intermediates.

Throughout the specification and claims the term "condensing", as used with reference to the formation of amides from carboxylic acids and primary or secondary amines, is intended to define a reaction in which a dehydrating agent is used which will dehydrate a carboxylic acid salt of an amine to an amide. As previously indicated, this property in certain halides, such as phosphorous oxychloride, thionyl chloride and phosphorous trichloride, is well known.

As many apparent and widely different embodiments of this invention may be made without departing from the spirit thereof, it is to be understood that I do not limit myself to the foregoing examples or description except as indicated in the following claims.

I claim:

1. The process which comprises heating anthraquinone-β-carboxylic acid with aniline in the presence of phosphorous trichloride, aluminium chloride and toluene.

2. The process of producing an amide which comprises reacting a carboxylic acid with an amine selected from the group consisting of primary and secondary amines in the presence of aluminium chloride and a dehydrating agent selected from the group consisting of phosphorous oxychloride, phosphorous trichloride and thionyl chloride.

3. The process of producing an amide which comprises condensing a carboxylic acid with an amine selected from the group consisting of primary and secondary amines in the presence of a dehydrating agent of the type normally used to promote amide formation, aluminium chloride, and in an inert solvent or suspension medium.

4. The process of producing an amide which comprises condensing an aryl monocarboxylic acid of the benzene, naphthalene or anthracene series with an amine selected from the group consisting of primary and secondary aryl amines of the benzene series in the presence of a dehydrating agent normally used to promote amide formation and aluminium chloride.

5. The process of producing an amide which comprises reacting an aryl monocarboxylic acid of the benzene, naphthalene or anthracene series with an amine selected from the group consisting of primary and secondary aryl amines of the benzene series in the presence of aluminium chloride and a dehydrating agent selected from the group consisting of phosphorous oxychloride, phosphorous trichloride and thionyl chloride.

6. The process of producing an amide which comprises adding to an inert solvent or suspension medium an aryl monocarboxylic acid of the benzene, naphthalene or anthracene series and an amine selected from the group consisting of primary and secondary aryl amines of the benzene series, subsequently adding aluminium chloride and then a dehydrating agent which is a member of the group consisting of phosphorous oxychloride, phosphorous trichloride and thionyl chloride, and maintaining the mixture at condensation temperature.

7. The process of producing an amide which comprises condensing an anthraquinone carboxylic acid with an amine selected from the group consisting of primary and secondary amines in the presence of a dehydrating agent normally used to promote amide formation and aluminium chloride.

8. The process of producing an amide which comprises condensing an anthraquinone carboxylic acid with an amine selected from the group consisting of primary and secondary amines in an inert solvent or suspension medium and in the presence of a dehydrating agent normally used to promote amide formation and aluminium chloride.

9. The process of producing the anilide of anthraquinone-β-carboxylic acid which comprises adding to toluene in the order named anthraquinone-β-carboxylic acid, aniline, a small amount of aluminium chloride and phosphorous trichloride, and refluxing the resultant mixture.

10. The process of producing salicyl anilide which comprises adding to chlorobenzene in the order named salicylic acid, aniline, a small amount of aluminium chloride and phosphorous trichloride, and refluxing the resultant mixture.

11. In the process of producing an amide by condensing a carboxylic acid with an amine, the improvement which comprises effecting the condensation in the presence of aluminum chloride.

12. In the process of producing an amide by reacting a carboxylic acid and an amine in the presence of a dehydrating agent which is adapted generally to promote condensations of this type, the improvement which comprises effecting the reaction in the further presence of aluminum chloride.

13. In the process of producing an aryl-amide by heating an aryl-carboxylic acid and an arylamine in the presence of a dehydrating agent normally used to promote amide formation, the improvement which comprises effecting the reaction in the presence of aluminum chloride.

RICHARD FRANK GOLDSTEIN.